US009121750B2

(12) United States Patent
Rode et al.

(10) Patent No.: US 9,121,750 B2
(45) Date of Patent: Sep. 1, 2015

(54) SYSTEM AND METHOD TO VISUALIZE MEASURING AND DOSING OPERATIONS

(75) Inventors: Jochen Rode, Dresden (DE); Bernhard Wolf, Dresden (DE)

(73) Assignee: SAP SE, Walldorf (DE)

( * ) Notice: Subject to any disclaimer, the term of this patent is extended or adjusted under 35 U.S.C. 154(b) by 1231 days.

(21) Appl. No.: 12/968,304

(22) Filed: Dec. 15, 2010

(65) Prior Publication Data

US 2012/0159370 A1 Jun. 21, 2012

(51) Int. Cl.
*G01G 23/37* (2006.01)
(52) U.S. Cl.
CPC .................................. *G01G 23/3721* (2013.01)
(58) Field of Classification Search
CPC ..... G01G 23/365; G01G 23/24; G01G 23/37; G01G 23/3721
USPC .......................................................... 715/772
See application file for complete search history.

(56) References Cited

U.S. PATENT DOCUMENTS

| | | | | |
|---|---|---|---|---|
| 4,628,470 | A * | 12/1986 | Baumann | 702/173 |
| 5,617,523 | A * | 4/1997 | Imazu et al. | 345/440 |
| 6,057,786 | A * | 5/2000 | Briffe et al. | 340/975 |
| 7,725,221 | B2 * | 5/2010 | Maris | 701/14 |
| 8,401,269 | B2 * | 3/2013 | Laroche et al. | 382/141 |
| 2002/0063737 | A1 * | 5/2002 | Feig et al. | 345/786 |
| 2003/0036683 | A1 * | 2/2003 | Kehr et al. | 600/300 |
| 2007/0172101 | A1 * | 7/2007 | Kriveshko et al. | 382/128 |
| 2007/0176933 | A1 * | 8/2007 | Culpi et al. | 345/440.2 |
| 2008/0135309 | A1 * | 6/2008 | Yuyama et al. | 177/1 |
| 2008/0165141 | A1 * | 7/2008 | Christie | 345/173 |
| 2009/0113295 | A1 * | 4/2009 | Halpern et al. | 715/273 |
| 2010/0011309 | A1 * | 1/2010 | Mitra et al. | 715/768 |
| 2010/0313162 | A1 * | 12/2010 | Preysman et al. | 715/781 |
| 2011/0001636 | A1 * | 1/2011 | Hedrick | 340/971 |
| 2012/0262472 | A1 * | 10/2012 | Garr et al. | 345/589 |

OTHER PUBLICATIONS

Rockwell Automation, Inc.; FactoryTalk Pharma Suite; 2009 Rockwell Automation, Inc. Milwaukee, WI 53204 USA; 2 pages (http://discover.rockwellautomation.com/IS_EN_Production_FactoryTalk_Pharma_Suite.aspx).

* cited by examiner

*Primary Examiner* — Ajay Bhatia
*Assistant Examiner* — Phoebe Pan

(57) ABSTRACT

Various embodiments of systems and methods to visualize measuring and dosing operations are described herein. In various embodiments, a computer user interface including a gauge bar, a progress bar, and a target value in combination with a weighing device may be used to measure and dose elements. In one embodiment the method ensures precise and fast dosing when weighing an element. In various embodiments, configuring a mapping function allows numerous combinations of a speed of progress of a progress bar when weighing an element. A progress bar, in combination with acceptable weight values, such as a target value, a primary minimum value, and a primary maximum value allows for color representation when a progress bar enters and exits acceptable weight values. Configuring a set or a plurality set of secondary minimum and maximum values is possible for additional acceptable weight values.

20 Claims, 9 Drawing Sheets

SYSTEM AND METHOD TO VISUALIZE MEASURING AND DOSING OPERATIONS

TECHNICAL FIELD

The invention generally relates to the field of a computer user interface, and more specifically to a system and method for presenting a user interface control for usage in a computer user interface for monitoring the process of measuring and dosing operations.

BACKGROUND

Measuring and dosing elements are ubiquitous in production, particularly in process industries. A typical task involves measuring, dosing, and weighing predefined amounts of a specific element on a weighing instrument. Precision is important in measuring the quantity of an element to achieve accuracy and so is speed in order to achieve efficiency. For example, a chemical operator has the responsibility of measuring the proper dosage of acetylsalicylic acid and corn starch in order to meet predetermined specifications for batch production of aspirin in the pharmaceutical sector. Such a job requires accuracy in order to reach a target amount so that one may continue onward to the next production batch.

Measuring and dosing devices often provide visual assistance to facilitate the measurement and dosing process. A gauge bar is a frequent form of visual aid that is provided to display measurement values. Each gauge bar may have a target marker that is visible to indicate the target amount that is needed for the current process. As an element is added to a weighing instrument, a progress bar that tracks the process of measurement fills the gauge bar until the target amount has been reached. Once reaching the target amount the process in complete and another element is placed onto the weighing device for the next production batch.

Common measuring and dosing user interfaces use a two level gauge bar approach. A first scale is used to visually represent weight values and a second scale that may be located above the first scale is used to display a magnified portion of the first scale as the progress bar reaches a target value. This type of visualization is cumbersome as a user must focus on one location, while weighing and then shift focus to the second linear gauge to acquire the target value. Furthermore, the gauge bar has different linear scales resulting in a slow speed of the progress bar in the first scale and a faster speed of the progress bar in the second scale. Such scaling complicates the task at hand as it becomes much more difficult to acquire a precise target value and needs much space for displaying two progress bars. A single gauge bar may also be used to measure and dose elements, but this would be even more difficult as the scale factor would be too small to show the details of the target value, thus making it close to impossible to reach a precise target value.

SUMMARY

Various embodiments of systems and methods for system and method to visualize measuring and dosing operations are described herein.

Described herein is a computer interface control for usage in a computer user interface to visualize measuring and dosing operations. In one aspect, a measurement scale and a pixel scale are configured. In yet another aspect, a mapping function is configured to map the measurement scale to a pixel scale. A mapped scale is retrieved from a configuration from the mapping function representing the measurement scale over the pixel scale.

In a further aspect, the computer user interface includes a gauge bar having a starting point value and an ending point value. In yet another aspect, the gauge bar includes a configurable target value, wherein the target value is represented as a target marker on the gauge bar. A primary minimum value and a primary maximum value are acceptable values and may also be configured and displayed on the gauge bar. A configuration of at least a secondary minimum value and a secondary maximum value may extend the range of acceptable weight values and are also displayed on the gauge bar. In a further aspect, a current value is indicative of a current measurement of an element displayed on the computer user interface. Contained within the gauge bar is a magnifier that magnifies a portion of the gauge bar. In one aspect, in response to weight, a progress bar increments or decrements according to the weight of an element on a weighing device. In one aspect, the progress bar fills with a first color, a second color, and a third color allowing a color representation when acquiring a target value of an element being weighed depending on the number of configured secondary minimum and secondary maximum values.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for system and method to visualize measuring and dosing operations are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

In various embodiments, the system and method to visualize measuring and dosing operations is a visual aid that allows achievement of get precise weight values of an element being weighed on a weighing device. In response to weight, a progress bar is used to measure progress of measurement to reach a target value of an element. Before the process of measuring begins, a set of primary minimum and a primary maximum values may be configured as a first set of acceptable measurement values. In addition, a set or a plurality set of secondary minimum and maximum values may be configured. A progress bar may be configured to fill specific colors as the progress bar passes the acceptable configured measurement ranges or may be configured to fill with one continuous color. During the process of measuring, the progress bar increments, passing the acceptable measurement ranges as it reaches a target value. As the progress bar nears the target value it enters a magnifier that magnifies a portion of the gauge bar, which in turn, offers a visual method for achieving an exact or close to exact target amount.

Figure 1:
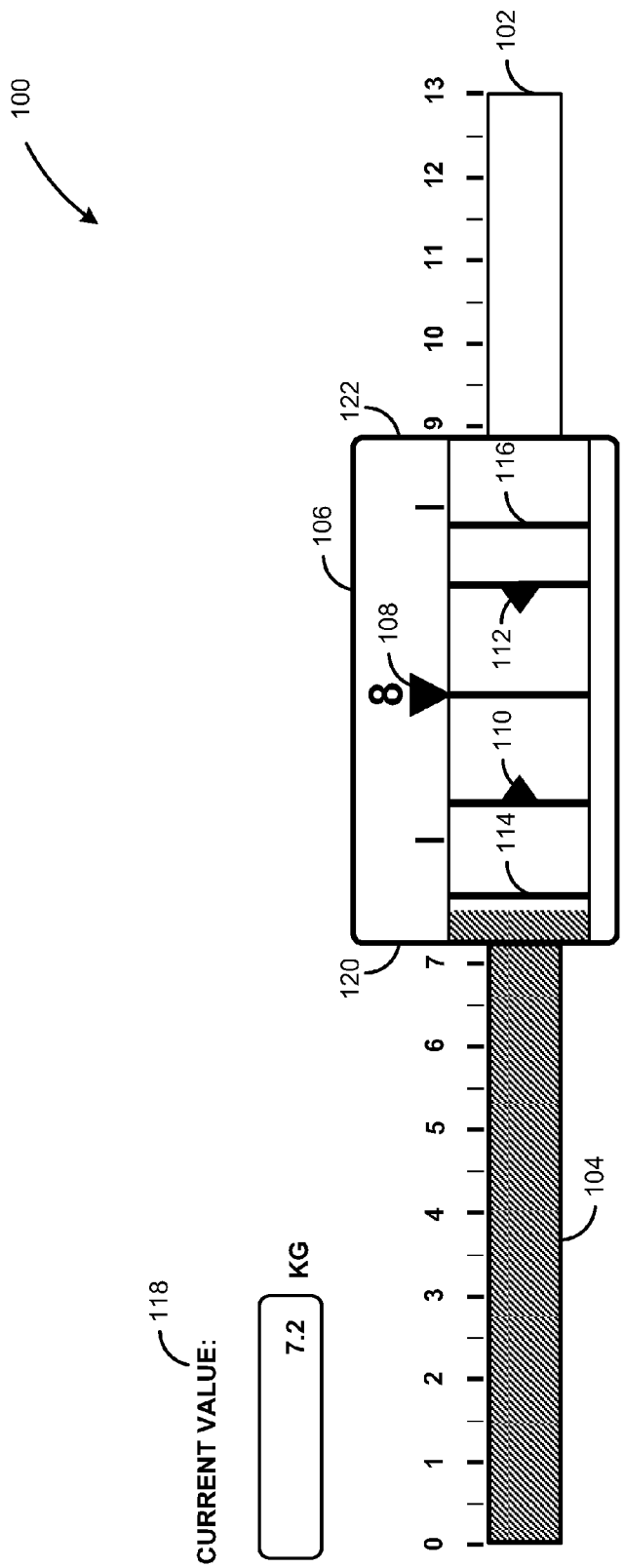
FIG. 1 is a block diagram illustrating a computer interface control for usage in a computer user interface with an exemplary illustration to visualize measuring and dosing operations according to various embodiments.

FIG. 1 is a block diagram illustrating a computer interface control 100 for usage in a computer user interface with an exemplary illustration to visualize measuring and dosing operations according to various embodiments. Referring to FIG. 1, a gauge bar 102 may be used to display measurement values along a gauge bar in communication with a weighing device. A gauge bar has a starting point value that may start at zero or any other value and an end point value. When detecting an element to be weighed on the weighing device, a progress bar 104 increments to display a progress of measurement. In conjunction, a current value 118 increments or decrements to indicate the value of the current measurement of the element being weighed. The progress bar 104 progresses through a magnifier 106 which magnifies a portion of the gauge bar 102. The magnifier has a starting point of the magnifier 120 and an ending point of the magnifier 122 representing thresholds and can be contained within the gauge bar.

Displayed along the gauge bar are configurable markers for acceptable ranges of measurement when weighing an element. By default, the magnifier is positioned over the acceptable ranges of measurement. A target value 108 is an optimal measurement that can be achieved when weighing an element. A target value 108 may also be optional if other acceptable weight values are configured. A primary minimum value 110 is a minimum weight value that can be acceptable if the weight of the element is, for example, below the target value 108. A primary maximum value 112 is a maximum weight value that can be acceptable if the weight of the element is, for example, above the target value 108. Configuration of a secondary set of acceptable ranges of measurement may also be possible. A secondary minimum value 114 is a secondary acceptable minimum weight value if the weight of the element is below the primary minimum value 110 and a secondary maximum value 116 is a secondary maximum acceptable weight value if the weight of the element is above the primary maximum value 112. When detecting an element to be weighed, a progress bar 104 increments and is filled with a first color. The progress reaches a magnifier 106 that magnifies a portion of the gauge bar and passes the starting point threshold of the magnifier 120. The progress bar remains a first color until reaching the secondary minimum value 114.

Figure 2:
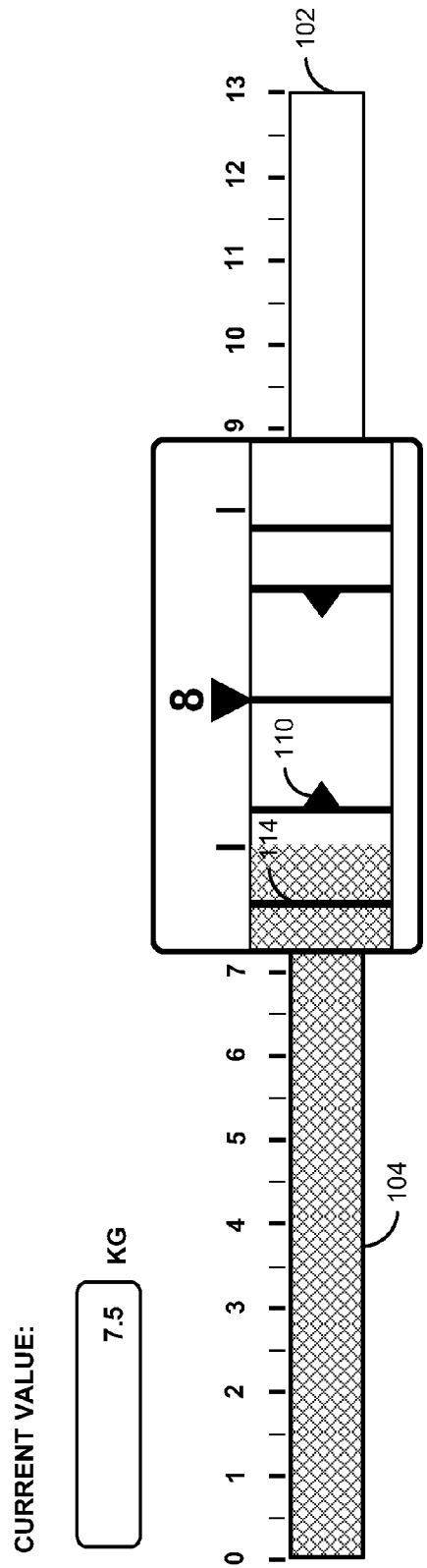
FIG. 2 is a block diagram illustrating a computer interface control for usage in a computer user interface with an exemplary illustration of incrementing a progress bar in relation to a secondary minimum value and a primary minimum value according to various embodiments.

FIG. 2 is a block diagram illustrating a computer interface control 100 for usage in a computer user interface with an exemplary illustration of incrementing a progress bar in relation to a secondary minimum value 114 and primary minimum value 110 according to various embodiments. Referring to FIG. 2, a gauge bar 102 may be used to display measurement values in communication with a weighing device. When detecting an element to be weighed, a progress bar 104 increments and is filled with a first color. However, when the progress bar passes the secondary minimum value 114 the progress bar is filled with a second color and remains the second color while it is between the secondary minimum value 114 and a primary minimum value 110.

Figure 3:
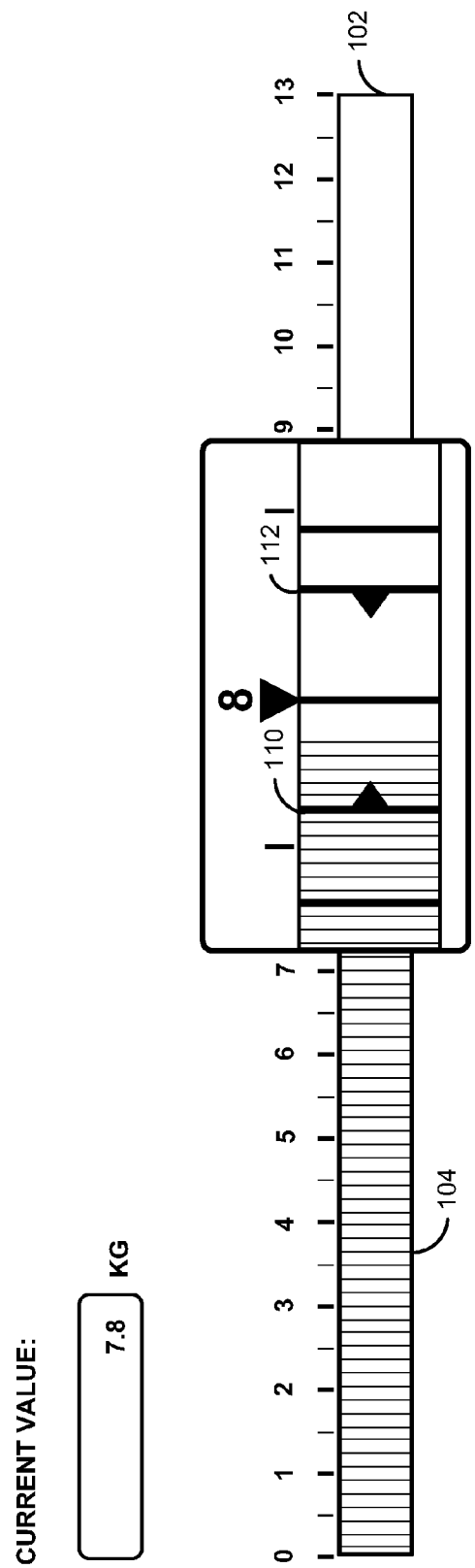
FIG. 3 is a block diagram illustrating a computer interface control for usage in a computer user interface with an exemplary illustration of incrementing a progress bar in relation to a primary minimum value and primary maximum value according to various embodiments.

FIG. 3 is a block diagram illustrating a computer interface control 100 for usage in a computer user interface with an exemplary illustration of incrementing a progress bar in relation to a primary minimum value 110 and a primary maximum value 112 according to various embodiments. Referring to FIG. 3, a gauge bar 102 may be used to display measurement values in communication with a weighing device. Once the progress bar 104 passes the primary minimum value 110 the progress bar 104 fills with a third color and remains a third color while it is between the primary minimum value 110 and the primary maximum value 112.

Figure 4:
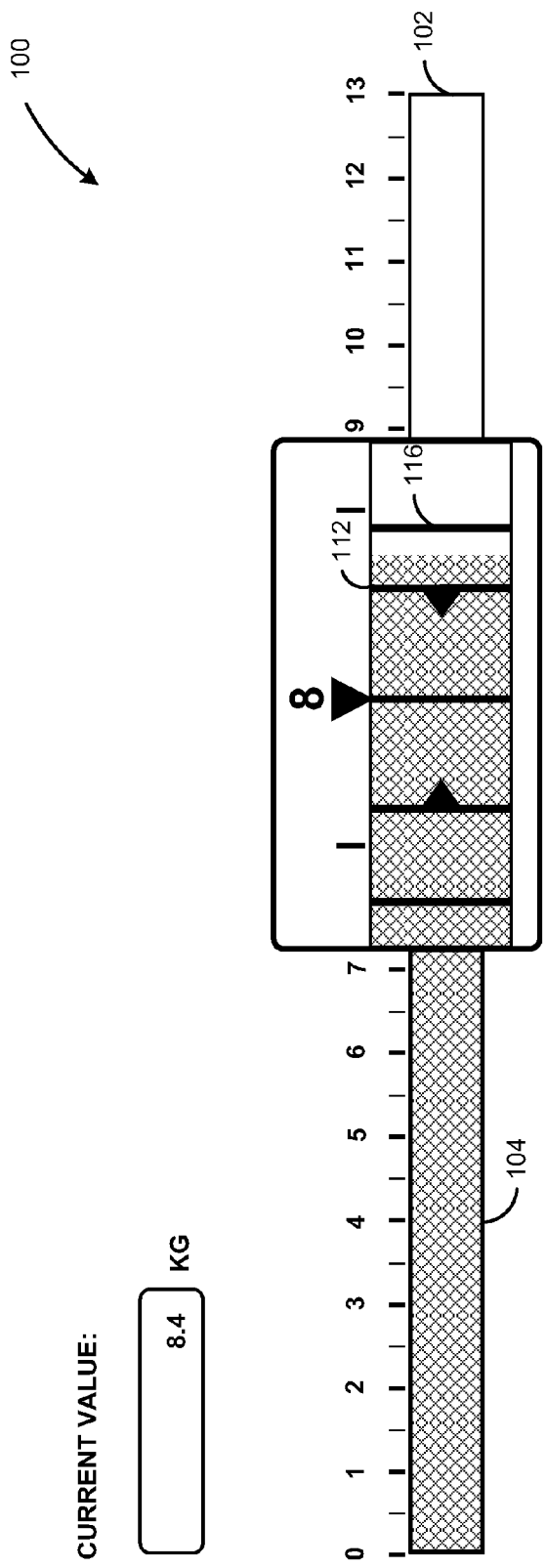
FIG. 4 is a block diagram illustrating a computer interface control for usage in a computer user interface with an exemplary illustration of incrementing a progress bar in relation to a primary maximum value and secondary maximum value according to various embodiments.

FIG. 4 is a block diagram illustrating a computer interface control 100 for usage in a computer user interface with an exemplary illustration of incrementing a progress bar in relation to a primary maximum value 112 and secondary maximum value 116 according to various embodiments. Referring to FIG. 4, a gauge bar 102 may be used to display measurement values in communication with a weighing device. Once the progress bar 104 has passed the primary maximum value 112 the progress bar 104 fills with the second color again while it is between the primary maximum value 112 and the secondary maximum value 116.

Figure 5:
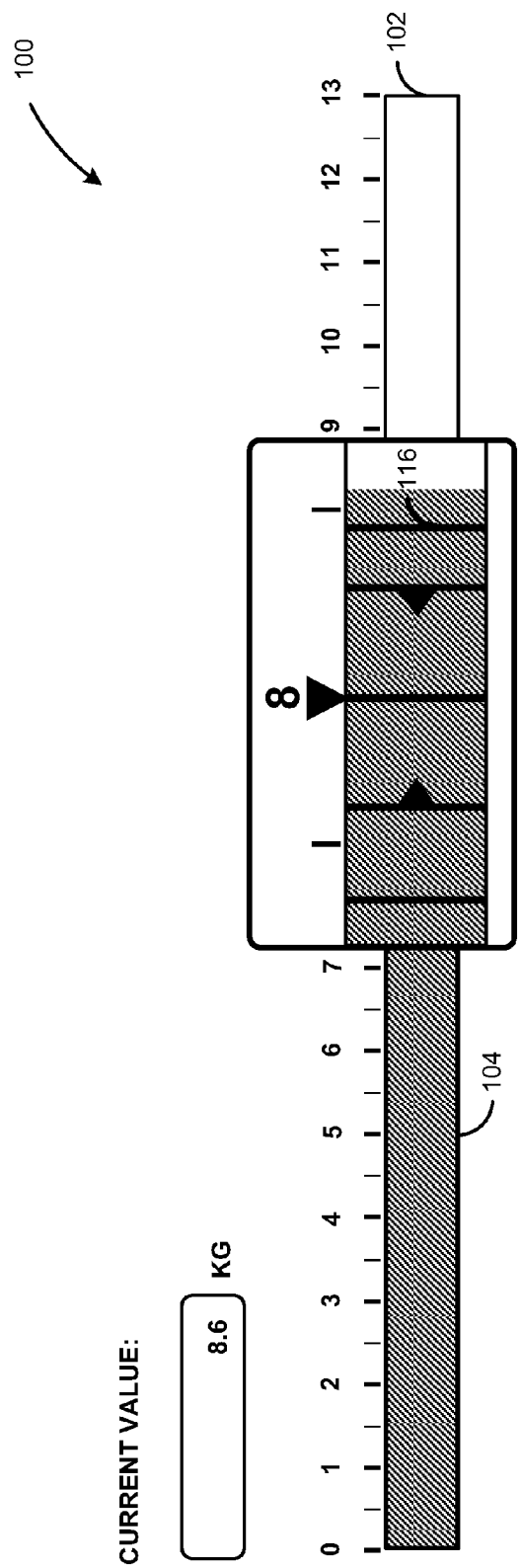
FIG. 5 is a block diagram illustrating a computer interface control for usage in a computer user interface with an exemplary illustration of incrementing a progress bar in relation a secondary maximum value according to various embodiments.

FIG. 5 is a block diagram illustrating a computer interface control 100 for usage in a computer user interface with an exemplary illustration of incrementing a progress bar in relation to a secondary maximum value 116 according to various embodiments. Referring to FIG. 5, a gauge bar 102 may be used to display measurement values in communication with a weighing device. When detecting an element to be weighed, a progress bar 104 increments and is filled with a first color. After the progress bar 104 has passed the secondary maximum value 116 it is filled again with the first color.

Figure 6:
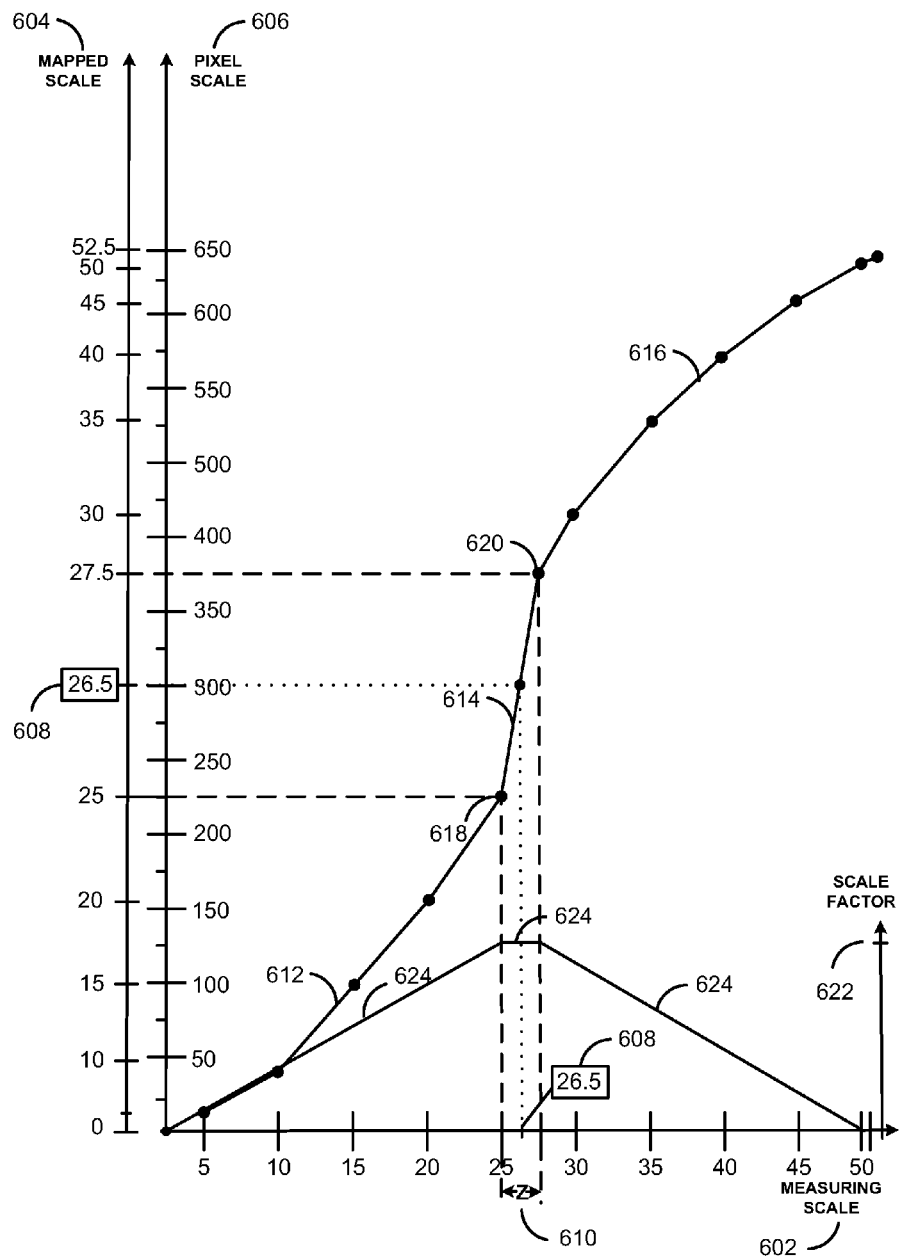
FIG. 6 is a graph diagram illustration of a mapping function and a resulting scale factor function for a progress bar according to various embodiments.

FIG. 6 is a graph diagram illustration of a mapping function and a resulting scale factor function for a progress bar according to various embodiments. The graph example displays non-linear scaling of a progress bar with increasing and decreasing slopes outside a magnifier and attempts to explain how a progress bar increments to an element being weighed as the progress bar reaches a target value 608. Referring to FIG. 6, a gauge bar partially consists of a magnifier 610, a target value 608 of the element being weighed, a measuring scale 602 representing measurement ranges coming from a measuring device, and a pixel scale 606 representing the horizontal size of the gauge bar at a computer user interface. The direction of the gauge bar may be configured to be vertical as well. A mapping function at 612, 614, and 616 can be configured and is specified to map measured values from the measuring scale 602 to the pixel scale 606. As a result, a mapped scale 604 derives from a mapping function at 612, 614, and 616 and represents the measurement scale 602 over the pixel scale 606. The first derivative of the mapping function at 612, 614, and 616 represents a scale factor function 624.

In the graph example, the values between 0 and 25 of the mapped scale 604 are mapped to the first 225 pixels of the pixel scale 606 along the slope described by a mapping function, such as a quadratic mapping function 612. The quadratic mapping function 612 graphs a parabola that opens upwards and can be calculated, for example, using a general form $y=ax^2+bx+c$. Therefore, a progress bar increments of the element being weighed until the progress bar reaches the starting point of the magnifier at 618. The scale factor 622 may be used to configure the mapping function at the starting point of the magnifier at 618 and the ending point of the magnifier at 620 to match the slopes where the transition points occur when entering a magnifier 618 and exiting a magnifier 620.

The magnifier values of 25 and 27.5 are mapped to pixel values of 225 to 375 of the pixel scale using a mapping function, such as a linear mapping function 614 and can be calculated using a general form $y=ex+f$, where $e=2a$, in the example. Adjusting the slopes of the mapping functions at the transition points allows the progress bar to achieve a smooth transition when entering the magnifier 618 and exiting the magnifier 620. Once the progress bar passes the ending point of the magnifier at 626 the progress bar speed decrements. Therefore, the progress bar actually increments, but at a slower pace as the mapped scale values 27.5 to 52.5 are mapped to the pixel scale values of 375 to 650 of the pixel scale 606 along the slope using a mapping function, such as a negative quadratic mapping function 616.

In one embodiment, scale factor of a progress bar can be further explained. A mapped scale may be mapped by any continuous function. For example a mapping function can be assigned a linear, non-linear, cubic, quadratic, or any continuous function. Additionally, non-linear scaling is always related to a mapping function, since the resulting mapped scale has a non-linear scale. In contrast, a scale factor function may have linear parts, as in the example of using a quadratic function. A target value, primary minimum and maximum values, and secondary minimum and maximum values are independent from the magnifier, but can be considered when configuring the magnifier to the various scales.

In one embodiment, speed of progress of a progress bar can be further explained. The mapped scale 604 in combination with pixels scale 606 determines the speed of progress of a progress bar. A speed of progress depends on the filling speed, as well as, the mapping function 612. It results from the configuration of the mapping function 612 and the changing measurement values, for example, when filling a container. Therefore, the speed of progress may increase or decrease along with the weight measured by the weighing device. Furthermore, due to the potential configuration options of the mapping function the speed of progress of a progress bar may be customized. Since a mapping function may be assigned any continuous function, the possibilities of defining a speed of progress of a progress can be numerous for when the progress reaches the starting point of the magnifier 618, when within the magnifier 610, and when exiting the ending point of the magnifier 620.

Figure 7:
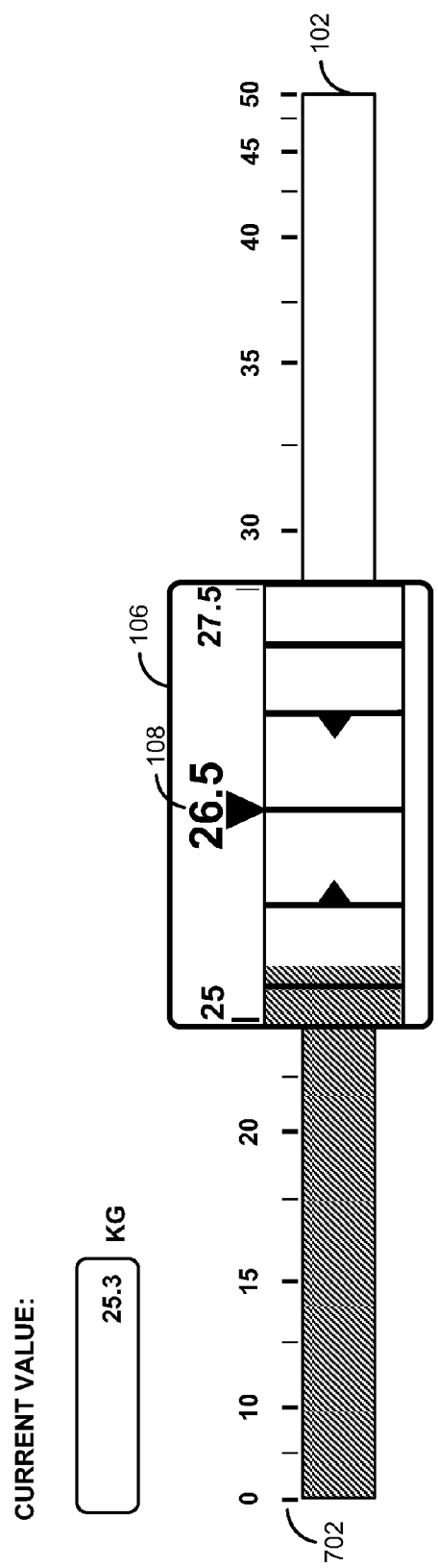
FIG. 7 is a block diagram illustrating a computer interface control for usage in a computer user interface with an exemplary illustration of non-linear scaling.

FIG. 7 is a block diagram illustrating a computer interface control 100 for usage in a computer user interface with an exemplary illustration of non-linear scaling. The block diagram of a computer interface control 100 is a visualization of the graph diagram illustration of FIG. 6 and displays non-linear scaling of a progress bar at a computer user interface. Referring to FIG. 7 a gauge bar 102 is a visual representation of the pixel scale 606 from FIG. 6 determining the size of the gauge bar 102. The gauge bar scale 702 is a visualization of the mapped scale 604 of FIG. 6. A magnifier 610 from FIG. 6 is visually represented by a magnifier 106 and a target value 608 from FIG. 6. is visually represented by a target value 108.

Figure 8:
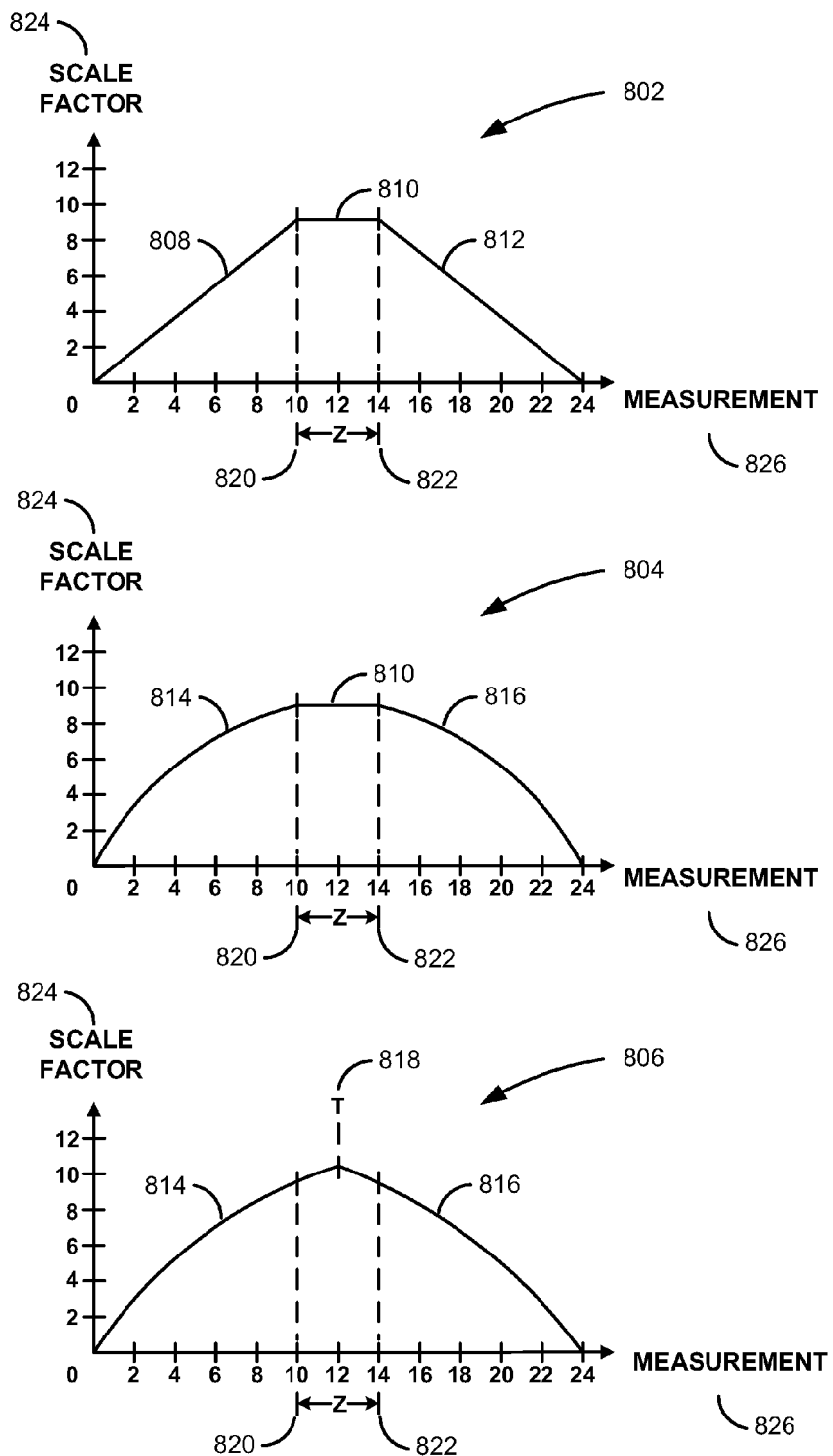
FIG. 8 is a graph diagram illustrating samples of different scale factor functions for a progress bar according to various embodiments.

FIG. 8 is a graph diagram illustrating samples of different scale factor functions for a progress bar according to various embodiments. The following illustrates a graph representation of a measuring and dosing computer user interface which uses non-linear scale factor of a progress bar. Graph 802 is an exemplary illustration of a constant scale factor change. A progress bar increments at a linear increasing scale factor 824 in combination with the measurement 826 of the element being weighed. The following example illustrates the scale and measurement having proportionality. Therefore, a progress bar increases scale factor at a constant rate 808 until the progress reaches the starting point of the magnifier 820. Once the progress bar is within the magnifier the scale factor is constant 810. As the progress bar passes the ending point of the magnifier 822 the progress bar decreases scale factor at a constant rate 812.

Non-linear graph 804 is an exemplary illustration representing a variable and a constant scale factor of a progress bar. A progress bar increments at a scale factor 824 in combination with the measurement 826 of the element being weighed. A progress bar increases scale factor at a variable rate 814 until the progress reaches the starting point of the magnifier 820. Once the progress bar is within the magnifier the scale factor is constant 810. As the progress bar passes the ending point of the magnifier 822 the progress bar decreases scale factor at a variable rate 816.

Non-linear graph 806 is an exemplary illustration representing a variable scale factor change. A progress bar increments at a scale factor 824 in combination with the measurement 826 of the element being weighed. A progress bar increases scale factor at a variable rate 814 until the progress reaches the starting point of the magnifier 820. The progress bar continues at a variable scale factor once the progress bar reaches the target value 818. After passing the target value at 818 the progress bar decreases scale factor at a variable rate 816 and continues to decrease at a variable rate as the progress bar passes the ending point of the magnifier 822. In each of the above described portions of the progress bar, the scale factor may increase or decrease along with the weight measured by the weighing device.

In various embodiments, a system and method to visualize measuring and dosing operations described herein may have a number of benefits. The use of the mapped scale based on a mapping function with properly adjusted scale factors allows an altered scale factor of the progress bar inside and outside the magnifier. Instead of having a fast speed change transition in the magnified area or a jump effect, a smooth changeover permits facilitating a precise and fast dosing of an element. The mapping function and a center focus of values, such as the target value, primary minimum value, and primary maximum value on the gauge bar may be set automatically by an application that drives the measuring and dosing process or may also be adjusted manually by the worker executing the measuring and dosing task.

The possibility of assigning a linear, non-linear, cubic, quadratic, and other continuous functions to a scale offers numerous possibilities of scaling and speed of a progress bar. Therefore, the scale factor and speed of progress may be customized to the specific process or choosing of the worker measuring an element. In addition, the ability to customize non-linear scaling of a progress bar is an advantage not only for weighing an element, but also for continuously filling of an element. For example, when filling a container, a worker can see the progress of a progress bar within the gauge bar as an element is continuously filled on the weighing device. This allows the worker to precisely determine the amount of an element that he or she need.

The introduction of the integrated magnifier is not only an instrument to perform a zoom in functionality, similar to a simple magnifying glass. The magnifier does not hide any portion of the gauge bar from view, but rather displays an even visual transition of measurement values as the gauge bar enters and exits the magnifier thresholds. Another benefit is the ability to integrate the magnifier within the gauge bar, thereby saving vertical screen space. This also allows a user to focus on a single point on the computer screen without changing focus as is the case when a magnifier is located separately of the gauge bar to show the details of the target value. Furthermore, a plurality of configurable secondary minimum values and secondary maximum values are possible to further increase the acceptable ranges when weighing an element.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 9:
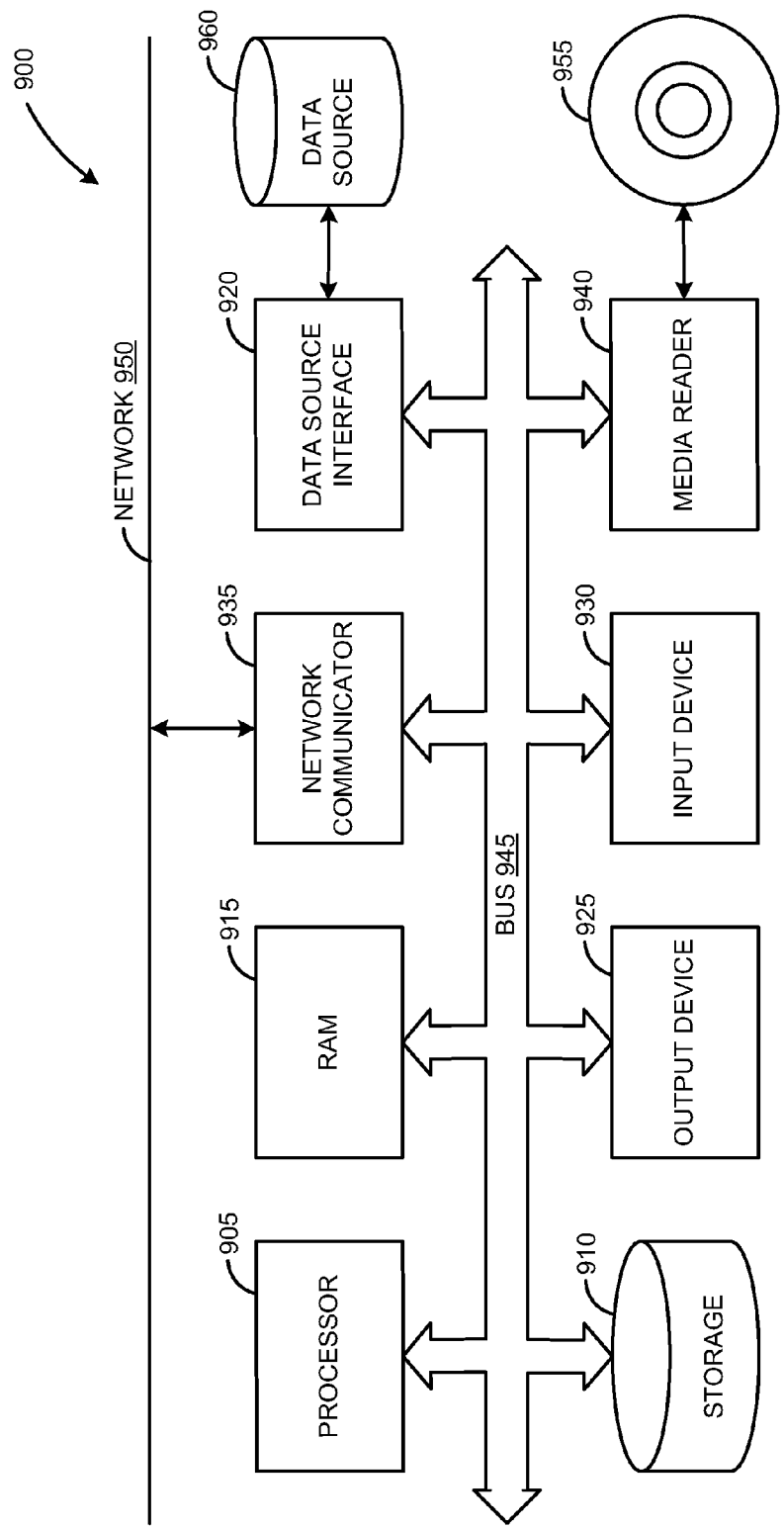
FIG. 9 is a block diagram of an exemplary computer system according to various embodiments.

FIG. 9 is a block diagram of an exemplary computer system 900. The computer system 900 includes a processor 905 that executes software instructions or code stored on a computer readable storage medium 955 to perform the above-illustrated methods of the invention. The computer system 900 includes a media reader 940 to read the instructions from the computer readable storage medium 955 and store the instructions in storage 910 or in random access memory (RAM) 915. The storage 910 provides a large space for keeping static data where at least some instructions could be stored for later execution. The stored instructions may be further compiled to generate other representations of the instructions and dynamically stored in the RAM 915. The processor 905 reads instructions from the RAM 915 and performs actions as instructed. According to one embodiment of the invention, the computer system 900 further includes an output device 925 (e.g., a display) to provide at least some of the results of the execution as output including, but not limited to, visual information to users and an input device 930 to provide a user or another device with means for entering data and/or otherwise interact with the computer system 900. Each of these output devices 925 and input devices 930 could be joined by one or more additional peripherals to further expand the capabilities of the computer system 900. A network communicator 935 may be provided to connect the computer system 900 to a network 950 and in turn to other devices connected to the network 950 including other clients, servers, data stores, and interfaces, for instance. The modules of the computer system 900 are interconnected via a bus 945. Computer system 900 includes a data source interface 920 to access data source 960. The data source 960 can be accessed via one or more abstraction layers implemented in hardware or software. For example, the data source 960 may be accessed by network 950. In some embodiments the data source 960 may be accessed via an abstraction layer, such as, a semantic layer.

A data source is an information resource. Data sources include sources of data that enable data storage and retrieval.

Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to tangibly store instructions, which when executed by a computer, cause the computer to:
    configure a measurement scale, the measurement scale representing measurement values determined by a weighing device;
    configure a pixel scale, the pixel scale representing a size of a gauge bar at a computer user interface, wherein the gauge bar further comprises a magnifier integrated within the gauge bar, the magnifier magnifying a portion of the gauge bar and a progress bar displayed within the gauge bar, the magnifier having a starting point, an ending point, and a target value located within the gauge bar;
    deriving, from a mapping function mapping measured values from the measurement scale to the pixel scale, a mapped scale to represent the measurement scale over the pixel scale, wherein the mapped scale in combination with the pixel scale determines a speed of progress of the progress bar displaying a progress of measurement of an element being weighed, wherein the speed of progress changes when the progress bar reaches the starting point of the magnifier and the speed of progress changes when the progress bar passes the ending point of the magnifier; and
    detect a weight of the element being weighed on the weighing device and in response to detecting the weight of the element, incrementing or decrementing the progress bar in combination with displaying the weight of the element.

2. The article of manufacture of claim 1, further comprising a first derivative of the mapping function representing a scale factor function.

3. The article of manufacture of claim 1, wherein configuring the mapping function comprises using a continuous function.

4. The article of manufacture of claim 1, further comprising instructions which when executed cause the computer to:
    configure the mapping function in combination with detecting the weight of the element resulting in a plurality of possibilities of a speed of progress of the progress bar.

5. The article of manufacture of claim 1, further comprising instructions which when executed cause the computer to:
    configure a target value.

6. The article of manufacture of claim 5, further comprising instructions which when executed cause the computer to:
    configure a primary minimum value and a primary maximum value.

7. The article of manufacture of claim 6, further comprising instructions which when executed cause the computer to:
    configure at least a secondary minimum value and a secondary maximum value.

8. The article of manufacture of claim 7, further comprising instructions which when executed cause the computer to:
    fill the progress bar with a first color when the progress bar reaches a the secondary minimum value or passes the secondary maximum value;
    fill the progress bar with a second color when the progress bar is between the secondary minimum value and the primary minimum value or the secondary maximum value and the primary maximum value; and
    fill the progress bar with a third color when the progress bar remains between the primary minimum value and the primary maximum value.

9. A computer-implemented method for measuring and dosing elements, the method comprising:
    configuring a measurement scale, the measurement scale representing measurement values determined by a weighing device;
    configuring a pixel scale, the pixel scale representing a size of a gauge bar at a computer user interface, wherein the gauge bar further comprises a magnifier integrated within the gauge bar, the magnifier magnifying a portion of the gauge bar and a progress bar displayed within the gauge bar, the magnifier having a starting point, an ending point, and a target value located within the gauge bar;
    deriving, from a mapping function mapping measured values from the measurement scale to the pixel scale, a mapped scale to represent the measurement scale over the pixel scale, wherein the mapped scale in combination with the pixel scale determines a speed of progress of the progress bar displaying a progress of measurement of an element being weighed, wherein the speed of progress changes when the progress bar reaches the starting point of the magnifier and the speed of progress changes when the progress bar passes the ending point of the magnifier; and detecting a weight of the element being weighed on the weighing device and in response to detecting the weight of the element, incrementing or decrementing the progress bar in combination with displaying the weight of the element.

10. The method of claim 9, further comprising a first derivative of the mapping function representing a scale factor function.

11. The method of claim 9, wherein configuring the mapping function comprises using a continuous function.

12. The method of claim 9, further comprising configuring the mapping function in combination with detecting the weight of the element resulting in a plurality of possibilities of a speed of progress of the progress bar.

13. The method of claim 9, further comprising configuring a target value.

14. The method of claim 13, further comprising configuring a primary minimum value and a primary maximum value.

15. The method of claim 14, further comprising configuring at least a secondary minimum value and a secondary maximum value.

16. The method of claim 15, further comprising;
filling the progress bar with a first color when the progress bar reaches the secondary minimum value or passes the secondary maximum value;
filling the progress bar with a second color when the progress bar is between the secondary minimum value and the primary minimum value or the secondary maximum value and the primary maximum value; and
filling the progress bar with a third color when the progress bar remains between the primary minimum value and the primary maximum value.

17. A computer user interface, embodied on one or more non-transitory computer readable storage media and executed on a computer for measuring and dosing elements, the computer user interface comprising:

a gauge bar having a starting point value and an ending point value;

a magnifier displaying a magnified portion of the gauge bar, wherein the magnifier is integrated within the gauge bar and has a starting point and an ending point within the gauge bar;

a current value indicative of a current measurement of an element, the current value displayed on the computer user interface; and a progress bar filling the gauge bar indicative of the current measurement in correspondence with the current value, wherein the progress bar fills the gauge bar at a speed that is based upon a mapped scale in combination with a pixel scale, and wherein the speed of progress of the progress bar changes when the progress bar reaches the starting point of the magnifier and the speed of progress of the progress bar changes when the progress bar passes the ending point of the magnifier.

18. The computer user interface of claim 17, further comprising a secondary minimum value marker, a secondary maximum value marker, a primary minimum value marker, a primary maximum value marker, and a target value marker.

19. The computer user interface of claim 17, further comprising a plurality of secondary minimum value markers and a plurality of secondary maximum value markers.

20. The computer user interface of claim 18, wherein the progress bar filling the gauge bar comprises:
a first color filling the progress bar as the progress bar reaches the primary minimum value marker or passes the primary maximum value marker;
a second color filling the progress bar as the progress bar is between the primary minimum value marker and the primary maximum value marker; and
a third color filling the progress bar as the progress bar is between the secondary minimum value marker and the primary minimum value marker, and between the secondary maximum value marker and the primary maximum value marker.

* * * * *